United States Patent [19]
Hollinger

[11] Patent Number: 5,675,125
[45] Date of Patent: Oct. 7, 1997

[54] SCREWLESS OUTLET BOX COVERING

[75] Inventor: Fred Hollinger, Kings Park, N.Y.

[73] Assignee: American Tack & Hardware Co., Inc., Monsey, N.Y.

[21] Appl. No.: 600,242

[22] Filed: Feb. 12, 1996

[51] Int. Cl.[6] .................................................. H02B 1/26
[52] U.S. Cl. ............................................ 174/66; 220/241
[58] Field of Search .............................. 174/66, 67, 48, 174/49; 220/241, 242

[56] References Cited

U.S. PATENT DOCUMENTS

| | | | |
|---|---|---|---|
| 1,829,422 | 10/1931 | Seltzer . | |
| 2,740,873 | 4/1956 | Cronk | 200/168 |
| 3,953,933 | 5/1976 | Goldstein | 40/152 |
| 4,631,354 | 12/1986 | Boteler | 174/66 |
| 4,780,573 | 10/1988 | Own | 174/66 |
| 4,800,239 | 1/1989 | Hill | 174/66 |
| 4,835,343 | 5/1989 | Graef et al. | 174/66 |
| 5,041,698 | 8/1991 | Takagi et al. | 174/66 |
| 5,153,816 | 10/1992 | Griffin | 361/393 |
| 5,180,886 | 1/1993 | Dierenbach et al. | 174/66 |
| 5,189,259 | 2/1993 | Carson et al. | 174/56 |

FOREIGN PATENT DOCUMENTS 2085229A  10/1980  United Kingdom ..................... 174/66

Primary Examiner—Kristine L. Kincaid
Assistant Examiner—Joseph Waks
Attorney, Agent, or Firm—Hedman, Gibson & Costigan, P.C.

[57] ABSTRACT

A thin decorative cover plate assembly for outlet boxes wherein the outer cover or face plate does not have screws.

13 Claims, 4 Drawing Sheets

FIG. 2
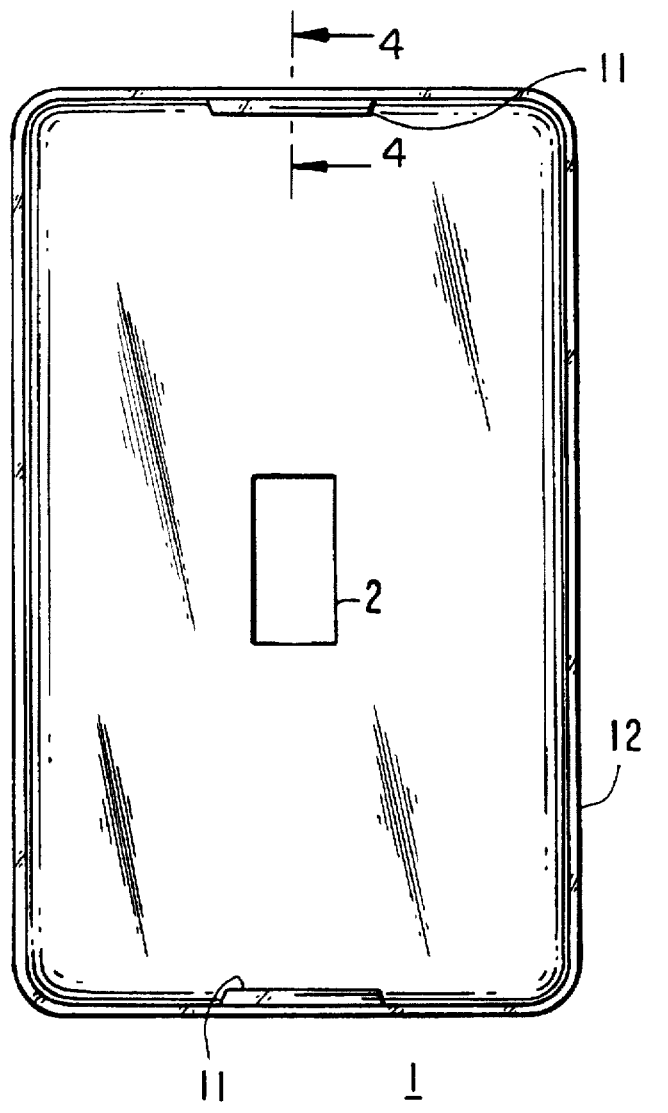
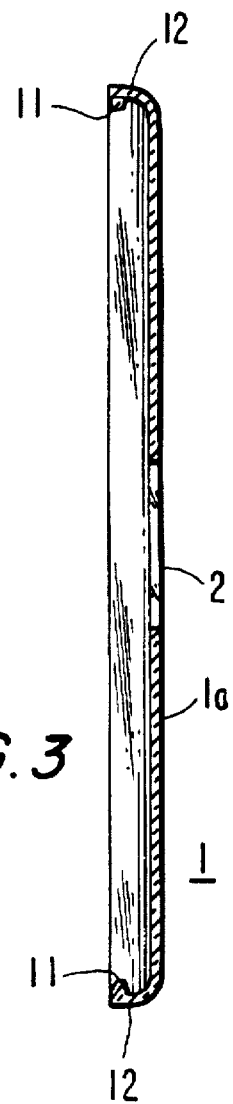
FIG. 3
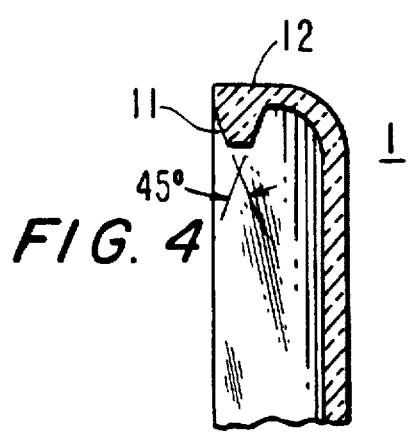
FIG. 4

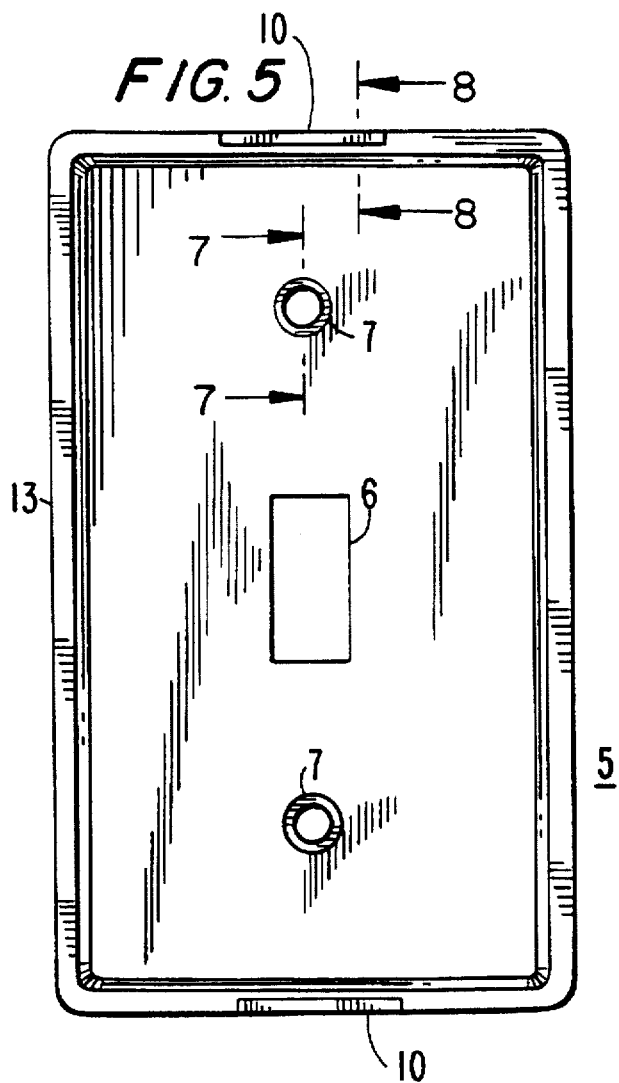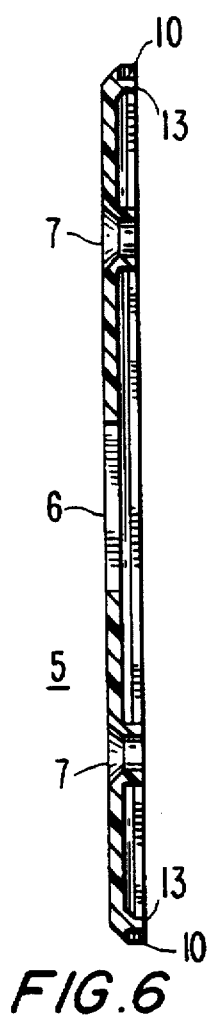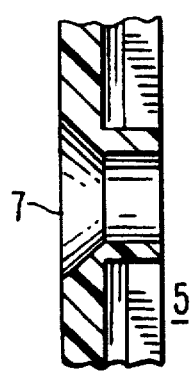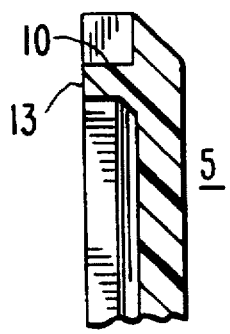

SCREWLESS OUTLET BOX COVERING

FIELD OF THE INVENTION

This invention relates a cover assembly for an outlet box. More specifically, this invention relates to a cover plate assembly for electrical switches, electrical outlets, cable television outlets and telephone outlets wherein the cover plate is a thin smooth screwless surface that can be decoratively coordinated with the room and changed at will.

BACKGROUND OF THE INVENTION

Typically outlet boxes such as electrical switches and electrical outlets are covered with a rectangular piece of molded metal or plastic fastened to the outlet box by screws.

Efforts have been undertaken to provide cover plates for outlet boxes that are more decorative and attractive than the traditional rectangular pieces of metal and plastic.

One approach toward making cover plates more decorative and attractive has been to sculpt, carve or mold various materials such as wood, stone, ceramic or metal into elaborate designs and patterns. This solution has proven to be very expensive and not completely satisfactory because the attachment screws are still visible.

Another approach for making cover plates more decorative and attractive is described in U.S. Pat. Nos. 4,780,573 and 3,953,933. These patents disclose cover plate assemblies wherein a decorative plate or picture is inserted into a recess formed in the cover plate. One of the disadvantages of these assemblies is that the edges of the cover plate are made very thick in order to receive the decorative plate or picture. The thick edges are unattractive and often do not incorporate the pattern of the decorative plate or picture.

SUMMARY OF THE INVENTION

It is an objective of the present invention to provide a decorative cover plate assembly wherein no attachment screws are visible.

It is a further object of the present invention to provide a thin decorative cover plate assembly wherein the decorative pattern is incorporated on the edges of the cover plate.

The foregoing objectives are met by a cover plate assembly comprising a base plate and a face plate.

The base plate comprises a top surface with at least one aperture for the outlet element and at least one recessed screw aperture, a lip that depends downwardly from the top surface and a first means for attaching the face plate to the base plate wherein the first attaching means are located on the lip of the base plate.

The base plate is attached to the outlet box by screws which are set approximately flush with the top surface of the base plate. The base plate may be made from metal, plastic, ceramic or wood. It is preferred that the base plate be made from a thermoplastic such as polystyrene, polypropylene, polycarbonate, polyvinyl chloride or any combination of the foregoing.

The face plate comprises a top surface with at least one aperture for the outlet element, a lip that depends downwardly from the top surface and a second means for attaching the face plate to the base plate wherein the second attachment means are located on the lip of the face plate.

The face plate may be made from metal, plastic, ceramic or wood. It is preferred that the base plate be made from a thermoplastic such as polystyrene, polypropylene, polycarbonate, polyvinyl chloride or any combination of the foregoing. The face plate may be sculpted, carved, molded, dyed, painted or decorated in any manner desired.

In a preferred embodiment the face plate is made from a clear or transparent thermoplastic resin such as polystyrene, polycarbonate, or acrylic and a decorative sheet is placed between the base plate and the face plate.

The decorative sheet is a thin sheet of material such as wallpaper, fabric or picture selected by the homeowner and is preferably shaped to cover the top surface and lip of the base plate. The decorative sheet also contains at least one aperture through which the outlet element passes. The decorative sheet may be secured to the base plate or face plate by any type of attachment means commonly known in the industry such as glue, tape or pressure sensitive adhesive. It is preferred that tape or pressure sensitive adhesive be used to secure the decorative sheet to the base or face plate so that the decorative sheet can be easily removed and changed if the decor of the room changes or the taste of the homeowner changes.

It is preferred that the entire decorative cover assembly be less than 12 mm, preferably less than 9 mm and most preferably less than 7 mm thick.

BRIEF DESCRIPTION OF THE DRAWINGS

FIG. 2 is a rear view of a preferred embodiment of the face plate of the present invention taken along lines 2—2 of FIG. 1.

FIG. 3 is a side sectional view of a preferred embodiment of the face plate of the present invention taken along lines 3—3 of FIG. 1.

FIG. 4 is an enlarged partial cross sectional view of a preferred embodiment of the second means for attaching the face plate to the base plate of the present invention as shown in FIG. 3.

FIG. 5 is a rear view of a preferred embodiment of the base plate of the present invention taken along lines 5—5 of FIG. 1.

FIG. 6 is a side sectional view of a preferred embodiment of the base plate of the present invention taken along line 6—6 of FIG. 1.

FIG. 7 is an enlarged cross sectional view of a preferred embodiment of the recessed screw aperture taken along lines 7—7 of FIG. 5.

FIG. 8 is an enlarged partial cross sectional view of a preferred embodiment of the first means for attaching the face plate to the base plate of the present invention.

DETAILED DESCRIPTION OF A PREFERRED EMBODIMENT

The present invention will be described in detail by reference to the drawings. The drawings are for illustration and are not intended to limit the scope of the invention.

Figure 1:
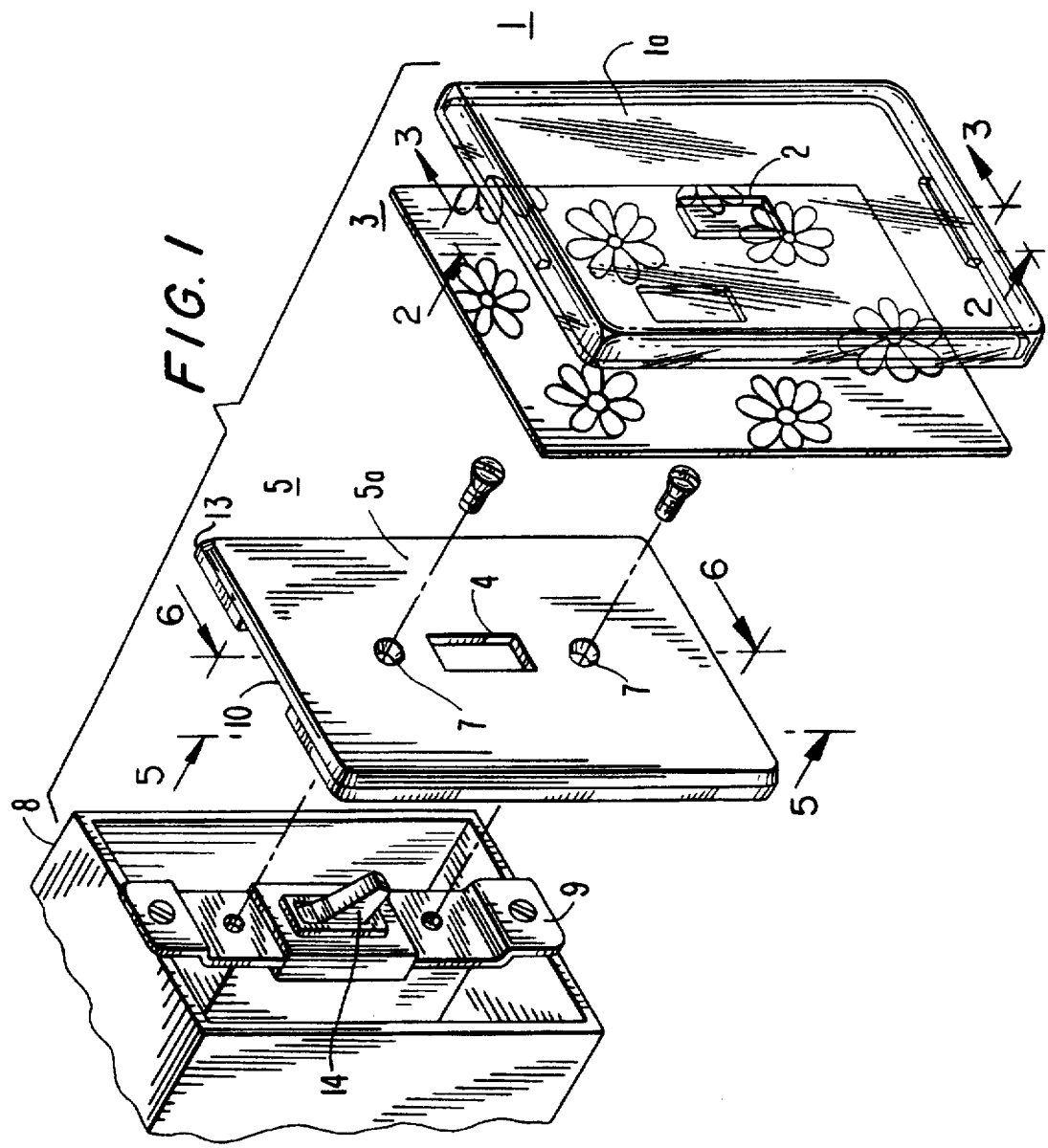
FIG. 1 is an exploded perspective view of a preferred embodiment of the present invention.
Figure 9:
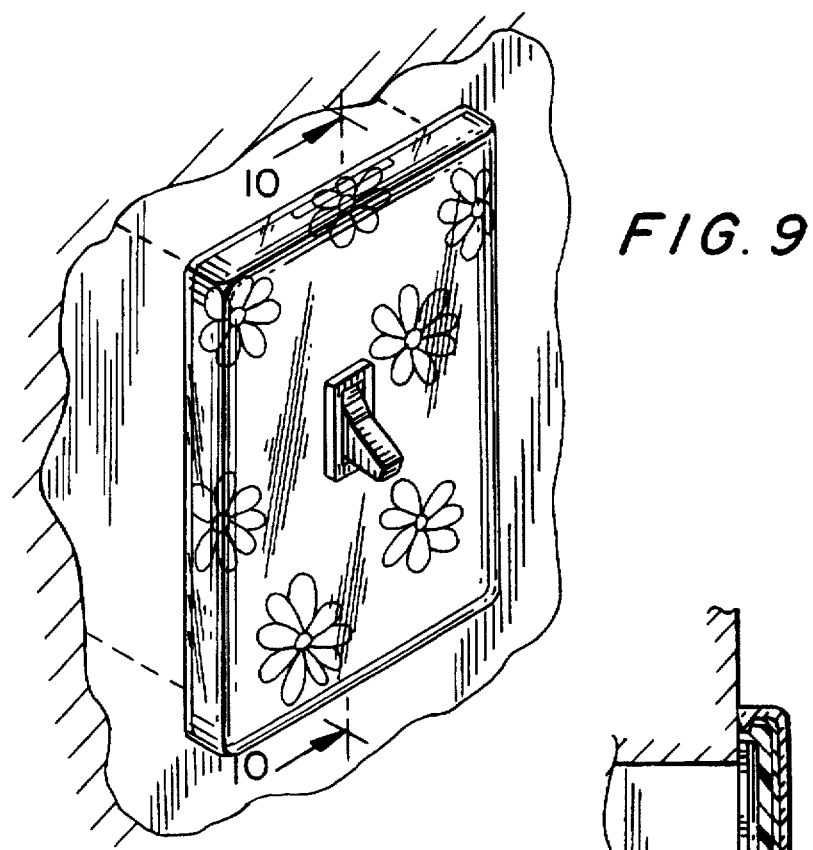
FIG. 9 is an enlarged cross sectional view of the assembled parts of the present invention.
Figure 10:
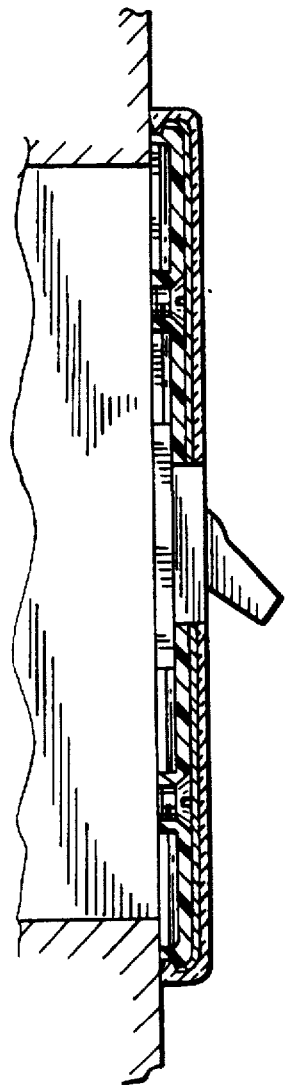
FIG. 10 is a cross sectional view of the assembled parts of the present invention taken along lines 10—10 of FIG. 9.

Referring to FIG. 1, the present invention is a decorative cover plate assembly for covering an electrical switch outlet box 8 and electrical switch mechanism 9. The assembly comprises a base plate 5, an optional decorative sheet 3 and a face plate 1 which should be transparent when the optional decorative sheet 3 is used.

The base plate 5 comprises a top surface 5a, a lip 13 that depends downwardly from the perimeter of the top surface 5a, an aperture 6 for electrical switch 14, screw holes 7 and a first attachment means or notch 10 formed on the lip 13.

The base plate 5 is made from high impact polystyrene modified with talc, commercially available from A. Schulman, Inc., under the trade designation RPP-1174-01. The base plate 5 is approximately 125.2 mm in length, 80 mm in width, 4.2 mm in height and the top surface 5a is approximately 2.0 mm thick. The lip 13 extends downwardly approximately 2.2 mm from the top surface 5a and is approximately 4.4 mm in width. The aperture 6 and screw holes 7 are sized and located on the top surface 5a of the base plate 5 at locations conforming to industry standards.

In the preferred embodiment, there are two notches formed in the lip 13. Each notch 10 is approximately 22.2 mm in length and approximately 1.2 mm in depth. The notches a preferably set opposite each other on either the longitudinal or lateral lengths of the lip 13.

The decorative sheet 3, if used, is a thin sheet of material such as a swatch of the wallpaper or wall border used in the room, a swatch of fabric used on the furniture or window dressing in the room or a picture. The decorative sheet 3 is shaped to cover the top surface 5a of the base plate and the downwardly depending lip 13. The decorative sheet 3 is secured to the top surface 5a and the downwardly depending lip 13 of the base plate 5 by conventional methods known in the art such as cellophane tape, pressure sensitive adhesive or glue. The decorative sheet 3 has an aperture 4 which allows the electrical switch 14 to pass through the decorative sheet 3. The decorative sheet 3 does not have any apertures for the attachment screws.

The face plate 1 comprises a top surface 1a, a lip 12 that depends downwardly from the perimeter of the top surface 1a, an aperture 2 which allows the electrical switch 14 to pass through the face plate 1 and a second attachment means or tab 11.

In the preferred embodiment wherein the face plate 1 is used with the decorative sheet 3, the face plate 1 is made from a clear thermoplastic resin such as clear polystyrene, commercially available from Diamond Polymers, under the trade designation MS-300. The face plate 1 is approximately 126.2 mm in length, 84 mm in width, 6.5 mm in height and the top surface 1a is approximately 1.63 mm thick. The lip 12 extends downwardly approximately 4.9 mm from the top surface 1a and is approximately 3.0 mm in width. The electrical switch aperture 2 is sized and located on the top surface 1a of the base plate 1 a location conforming to industry standards.

In a preferred embodiment, there are two tabs 11 formed on the lip 12. Each tab 11 is approximately 19 mm in length and 1.7 mm in width and extends vertically from the lip 12 approximately 1.0 mm in length. It is preferred that the end of tab 11 be tapered at approximately a 45° angle as shown in FIG. 4 to enable the tab 11 to easily engage or disengage from the notch 10. The tabs 11 are preferably set opposite each other on either the longitudinal or lateral lengths of lip 12 and correspond to the longitudinal or lateral placement of notches 10 on lip 13.

In practice, the cover plate assembly is attached to an outlet box 8 by passing the switch 14 through aperture 6 in base plate 5. Base plate 5 is then secured to the electrical switch 9 and outlet box 8 by screws or other conventional attachment means. It is preferred that the screws for securing the base plate 5 to the electrical switch 9 and outlet box 8 be set flush with the top surface 5a of base plate 5. This can be accomplished by counter sinking the screw holes 7 as shown in FIG. 7.

Once the base plate 5 is attached to electrical switch 9 and outlet box 8, the decorative sheet 3 is attached to the base plate 5 by applying a pressure sensitive adhesive to the top surface 5a and lip 13 of base plate 5 and marrying the decorative sheet 3 to the top surface 5a and lip 13 of base plate 5. When securing the decorative sheet 3 to base plate 5, the switch 14 must pass through aperture 4 in the decorative sheet 3.

Finally, the face plate 1 is attached to the base plate 5 and decorative sheet 3 by passing the switch 14 through aperture 2 of the face plate 1 and pressing the face plate 1 over the base plate 5 and decorative sheet 3 until the tabs 11 flex into notches 10 and thereby fasten the face plate 1 to the base plate 5.

The decorative sheet can be easily changed to match the changing decor of the room by merely prying the face plate 1 from the base plate 5, removing the old decorative sheet 3 and attaching a new decorative sheet as described above. The face plate is then secured to the base plate as described above.

Many variations of the present invention will suggest themselves to those skilled in this art in light of the above, detailed description. For example, the face plate may be made from a non transparent material that is sculpted, painted or molded with ornamental designs and thereby eliminate the need for the decorative sheet. In addition the notches 10 may be placed on the lip 12 and the tabs 11 placed on lip 13 or any other combination. Similarly, the assembly may be used to cover electrical outlets, cable television outlets, telephone outlets or similar structures. All such obvious modifications are within the full intended scope of the appended claims.

All the above mentioned patents, publications and test methods are herein incorporated by reference.

I claim:

1. A decorative cover plate assembly comprising:
   a base plate that comprises: a top surface with at least one aperture for an outlet element and at least one screw aperture; a lip that depends downwardly from the top surface of the base plate; and a first means for attaching a transparent face plate to the base plate wherein the first attaching means are notches formed in the lip of the base plate;
   a decorative sheet with an aperture for said outlet element and wherein the decorative sheet is shaped to cover the top surface and the lip of the base plate; and
   the transparent face plate that comprises: a top surface with at least one aperture for the outlet element; a lip that depends downwardly from the top surface of the face plate; and a second means for attaching the face plate to the base plate wherein the second attachment means are tabs that extend vertically from the lip of the face plate.

2. A cover plate assembly as defined in claim 1 wherein the cover plate assembly is less than 12 mm thick.

3. A cover plate assembly as defined in claim 1 wherein the cover plate assembly is less than 9 mm thick.

4. A cover plate assembly as defined in claim 1 wherein the cover plate assembly is less than 7 mm thick.

5. A cover plate assembly as defined in claim 1 wherein said decorative sheet is selected from a group of material consisting of wallpaper, wall border, fabric or picture.

6. A cover plate assembly as defined in claim 1 wherein the tabs are tapered at approximately a 45 degree angle.

7. A cover plate assembly as defined in claim 1 wherein the downwardly depending lip of the transparent face plate covers the downwardly depending lip of the base plate.

8. A decorative cover plate assembly comprising:

a base plate that comprises: a top surface with at least one aperture for an outlet element and at least one screw aperture; a lip that depends downwardly from the top surface of the base plate; and a first means for attaching a decorative face plate to the base plate wherein the first attaching means are notches formed in the lip of the base plate; and the decorative face plate that comprises: a top surface with at least one aperture for the outlet element; a lip that depends downwardly from the top surface of the face plate; and a second means for attaching the face plate to the base plate wherein the second attachment means are tabs that extend vertically from the lip of the face plate.

9. A cover plate assembly as defined in claim 8 wherein the downwardly depending lip of the decorative face plate covers the downwardly depending lip of the base plate.

10. A decorative cover plate assembly comprising:

a base plate that comprises: a top surface with at least one aperture for an outlet element and at least one screw aperture; a lip that depends downwardly from the top surface of the base plate; and a first means for attaching a transparent face plate to the base plate wherein the first attaching means are tabs that extend vertically from the lip of the base plate;

a decorative sheet with an aperture for said outlet element and wherein the decorative sheet is shaped to cover the top surface and the lip of the base plate; and the transparent face plate that comprises: a top surface with at least one aperture for the outlet element; a lip that depends downwardly from the top surface of the face plate; and a second means for attaching the face plate to the base plate wherein the second attachment means are notches formed in the lip of the face plate.

11. A cover plate assembly as defined in claim 10 wherein the downwardly depending lip of the transparent face plate covers the downwardly depending lip of the base plate.

12. A decorative cover plate assembly comprising:

a base plate that comprises: a top surface with at least one aperture for an outlet element and at least one screw aperture; a lip that depends downwardly from the top surface of the base plate; and a first means for attaching a decorative face plate to the base plate wherein the first attaching means are tabs that extend vertically from the lip; and the decorative face plate that comprises: a top surface with at least one aperture for the outlet element; a lip that depends downwardly from the top surface of the face plate; and a second means for attaching the face plate to the base plate wherein the second attachment means are notches formed in the lip of the face plate.

13. A cover plate assembly as defined in claim 12 wherein the downwardly depending lip of the decorative face plate covers the downwardly depending lip of the base plate.

* * * * *